United States Patent [19]

Shimaoka

[11] Patent Number: 4,595,963
[45] Date of Patent: Jun. 17, 1986

[54] FLEXIBLE MAGNETIC DISC DRIVING APPARATUS

[75] Inventor: Motohiro Shimaoka, Furukawa, Japan

[73] Assignee: Alps Electric Co., Ltd., Japan

[21] Appl. No.: 355,376

[22] Filed: Mar. 8, 1982

[30] Foreign Application Priority Data

Mar. 6, 1981 [JP] Japan ................................. 56-32267

[51] Int. Cl.⁴ ........................ G11B 5/016; G11B 5/55; G11B 21/22; G11B 21/08
[52] U.S. Cl. ..................................... 360/99; 360/105; 360/106; 360/130.34
[58] Field of Search ............. 360/99, 106, 105, 130.34

[56] References Cited

U.S. PATENT DOCUMENTS

| | | | |
|---|---|---|---|
| 4,085,428 | 4/1978 | Green et al. | 360/99 |
| 4,191,980 | 3/1980 | King et al. | 360/99 |
| 4,198,666 | 4/1980 | Manzke et al. | 360/106 |
| 4,218,714 | 8/1980 | Isozaki et al. | 360/130.34 |
| 4,315,289 | 2/1982 | Holecek et al. | 360/99 |
| 4,414,591 | 11/1983 | Wenner | 360/99 |

Primary Examiner—Robert S. Tupper
Attorney, Agent, or Firm—Guy W. Shoup

[57] ABSTRACT

A flexible magnetic disc driving apparatus including a flexible magnetic disc driving portion, a flexible magnetic disc placed in a jacket having two windows formed thereon and two head mechanisms, each consisting of a head and an elastic push member facing the head, wherein the head mechanisms are disposed such that one of them is capable of reading and writing the surface of the flexible magnetic disc while the other is capable of reading and writing the back of the flexible magnetic disc, are arranged with an acute angle with respect to the center of the flexible magnetic disc driving portion and are moved by one head moving mechanism.

4 Claims, 5 Drawing Figures

FLEXIBLE MAGNETIC DISC DRIVING APPARATUS

BACKGROUND OF THE INVENTION

This invention relates to a flexible magnetic disc driving apparatus. More particularly, the present invention relates to a construction of a double-face disc driving apparatus and is directed to provide a disc driving apparatus which is simple in construction and economical to produce and prolongs the service life of a flexible magnetic disc without damaging it.

As typically exemplified by U.S. Pat. No. 3,946,439, conventional double-face magnetic disc driving apparatuses generally have the construction in which a pair of heads supported by gimbal springs are allowed to oppose each other during rotation. According to this construction, however, the relative locating work of both heads to the flexible magnetic disc is not so easy and the timing adjustment of the face registration of both heads to the flexible magnetic disc is also difficult. Hence, the heads are most likely to damage the magnetic disc and thus to shorten its service life.

SUMMARY OF THE INVENTION

Briefly stated, the present invention is directed to provide a flexible magnetic disc driving apparatus which is simple in construction and yet is capable of eliminating the problems with the prior art apparatuses in general.

BRIEF DESCRIPTION OF THE DRAWINGS

The accompanying drawings illustrate preferred embodiments of the present invention, in which.

DESCRIPTION OF THE PREFERRED EMBODIMENTS

Figure 1:
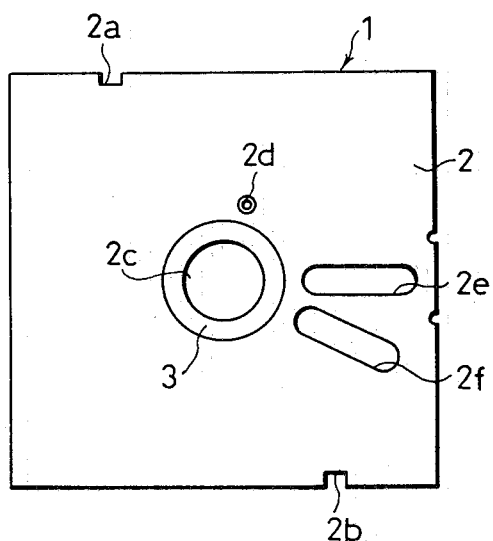
FIG. 1 is a plan view showing a medium.

Referring initially to FIG. 1, the construction of a medium 1 shown in FIG. 1 will be briefly explained. Reference numeral 2 represents a jacket for storing a flexible magnetic disc 3. The jacket 2 is equipped with slits 2a, 2b for detecting the medium 1, an aperture 2c for clamping and rotating the flexible magnetic disc 3, a small sector hole 2d and two thinly elongated windows 2e, 2f for permitting the heads to read and write.

These aperture 2c, sector hole 2d and windows 2e, 2f are also formed at the corresponding positions on the back of the jacket 2. The flexible magnetic disc 3 placed in the jacket 2 is rotated at a rate of 300 rpm by a flexible magnetic disc driving portion that will be described elsewhere. Reference numeral 5 represents a door for bringing in and out the flexible magnetic disc, and reference numeral 6 represents a rotary plate that moves a clamp mechanism 7 up and down in response to the operation of the door 5. Reference numeral 8 represents the abovementioned flexible magnetic disc driving portion which is connected to a motor 9 for driving. Reference numerals 10 and 11 represent first and second head mechanisms, respectively. Both head mechanisms are disposed at an angle of about 30 degrees with respect to the center of the flexible magnetic disc driving portion 8. The first head mechanism 10 consists of a moving member 13 to which a first read-write head 12 is fixed and a first rotary arm 15 having an elastic push member 14 fitted to the tip thereof. A guide portion 18 having holes, into which a pair of guide shafts 16, 17 are inserted, and an interconnecting portion 19 for interconnecting the later-appearing head moving mechanism are provided to the moving member 13. Reference numeral 20 represents an arm that extends substantially orthogonally from the first rotary arm 15. The mechanism for moving the rotary arm 15 downward or upward to load the read-write head 12 onto or to release it from the magnetic disc may be a conventional device, for example, as shown in U.S. Pat. No. 4,218,714, and need not be described further herein. The second head mechanism 11 consists of a moving member 21, a head fitting member 22 and a second rotary arm 23. In the same way as the first head mechanism 10, the moving member 21 is equipped with a guide portion 26 having holes into which guide shafts 24, 25 are inserted, and with an interconnecting portion 27 for interconnecting the later-appearing head moving mechanism.

A second read-write head 28 is fitted to the head fitting member 22 and an arm 29 is integrally formed with the head fitting member 22 so as to extend up to the position of the first rotary arm 15. An elastic push member 30 is fitted to the tip of the second rotary arm 23 so as to face the second read-write head 28. The abovementioned guide shafts 16, 17 and 24, 25 are firmly fixed in place by support plates 31, 32 and 33, 34, respectively, so that the moving members 13 and 21 are capable of moving with the aid of these guide shafts and the first and second heads 12 and 28 move simultaneously with the movement of the moving members 13 and 21.

Figure 5:
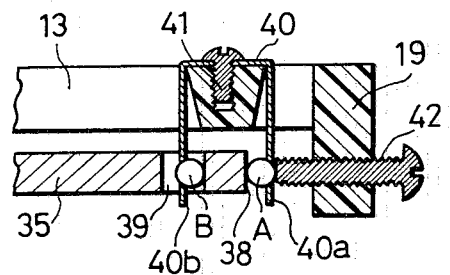
FIG. 5 is a sectional side view useful for explaining the relation between a cam of a head moving mechanism and an interconnecting member of a moving member.
Figure 2:
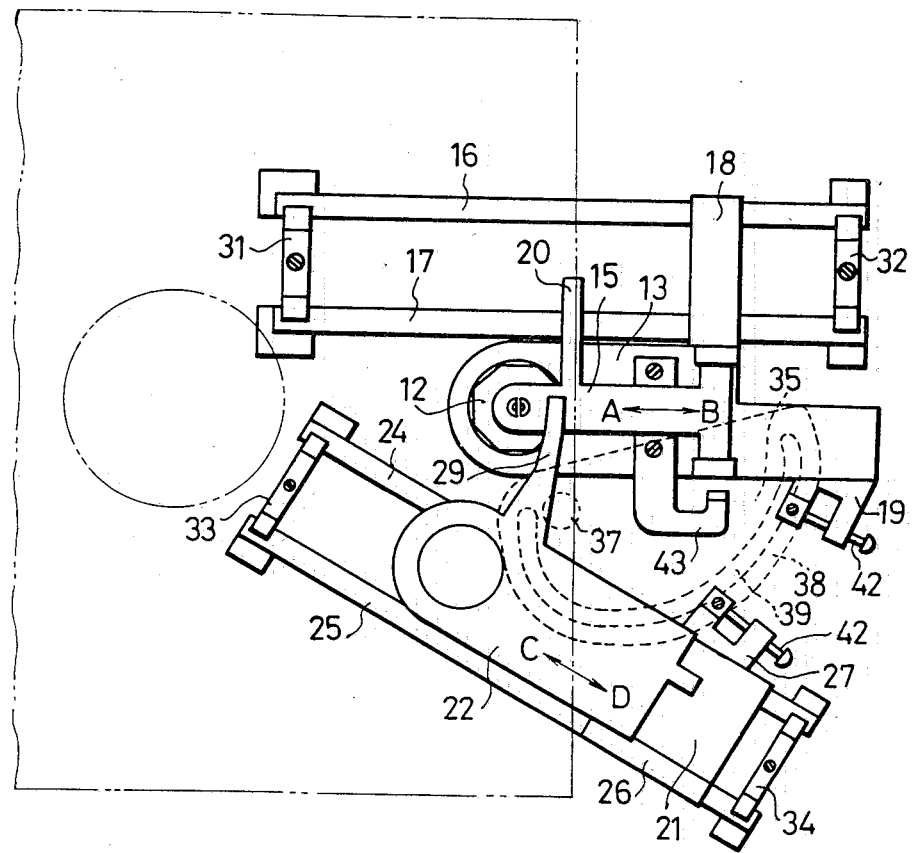
FIG. 2 is a plan view showing the relation of position between a first head mechanism and a second head mechanism of FIG. 1.
Figure 3:
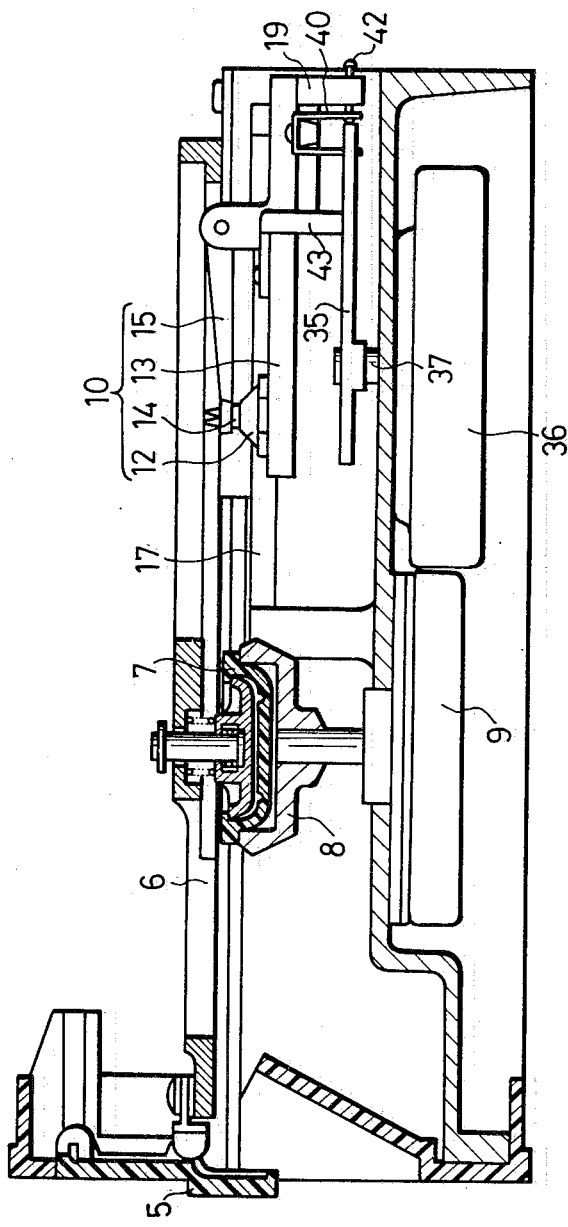
FIG. 3 is a sectional side view showing the first head mechanism and the principal portions of a flexible magnetic disc driving apparatus.
Figure 4:
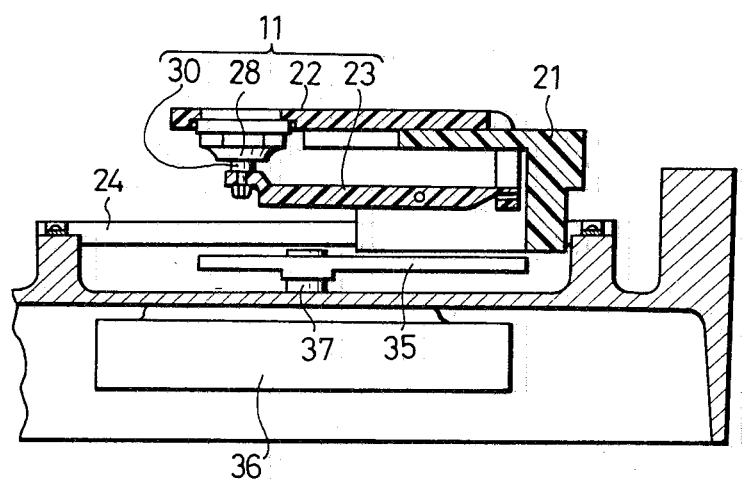
FIG. 4 is a sectional side view useful for explaining the second head mechanism.

Next, the head moving mechanism for simultaneously moving the first and second heads 12, 28 will be described. Reference numeral 35 represents a cam made of a metal and firmly fixed to a rotary shaft 37 of a step motor 36. Its outer circumference 38 serves as a guide surface and is associated with the aforementioned interconnecting portions 19, 27 together with a guide groove 39. The cam 35 and the interconnecting portion 19 employ the following interconnecting structure. As shown in FIG. 5, a ball A is pushed to the outer circumference 38 of the cam 35 by a spring plate 40a of a leaf spring 40 while another ball B is pushed and positioned into the guide groove 39 of the cam 35 by a spring plate 40b. The leaf spring 40 is fixed by a screw 41 to the interconnecting portion 19 that is integrally formed with the moving member 13. The ball A is constantly pushed to the outer circumference 38 of the cam 35 also by a screw 42 that is screwed to the interconnecting portion.

This structure for the first head mechanism 10 also holds true of the second head mechanism 11.

The head moving mechanism operates in the following way. When a signal is applied from the outside so as to move the first and second heads to predetermined track positions, whenever necessary, while the medium is correctly fitted to the flexible magnetic disc driving apparatus, the step motor 36 having the cam 35 fixed to its rotary shaft 37 rotates in the predetermined number of steps in response to the signal. Due to the rotation of the motor, the cam 35 also rotates simultaneously and a force acts upon the interconnecting portions 19 and 27 of the moving members 13 and 21 interconnected to the outer circumference 38 of the cam 35 via the ball A so as to move the moving members 13 and 21 in the directions indicated by arrows A, B and in the directions indicated by arrows C, D in accordance with the orbit of the outer circumference 38, respectively. For, the moving members 13 and 21 are under the guided state by the guide shafts 16, 17 and 24, 25 and are capable of moving only in the directions of the arrows A, B or C, D.

When the first and second heads 12, 28 finish moving to the predetermined track positions, a load signal is applied to the first head mechanism 10 and its first rotary arm 15 starts descending so that the elastic push member 14 at the tip of the arm 15 brings the flexible magnetic disc 3 into contact with the surface of the first head 12, bringing the back of the disc 3 under the state in which the head is capable of reading and writing. As the first rotary arm 15 lowers, the arm 29 of the head fitting member 22 placed on the first rotary arm 15 lowers so that the head fitting member 22 having the second head 28 fitted thereto lowers, permitting the second head 28 to read and write the surface of the flexible magnetic disc 3. In this manner, both surfaces of the disc can be read and written by the two heads.

Incidentally, reference numeral 43 represents a stopper that is fitted to the moving member 13 and engages with a protuberance 44 formed on the cam 35 so as to stop movement of the moving member 13 when the first head 12 reaches the 0 (zero) track position of the flexible magnetic disc 3.

As described in the foregoing, in the flexible magnetic disc driving apparatus in accordance with the present invention, the two head mechanisms, each consisting of the head and the elastic push member facing the head, are arranged close to each other so that one of the heads is capable of reading and writing the surface of the flexible magnetic disc and the other, the back of the same, and are moved by one head moving mechanism. This arrangement provides the following advantages. First, though the apparatus of the invention is capable of reading and writing both surfaces of the flexible magnetic disc, it does not damage the disc because the disc are interposed between the heads and the elastic push members. Thus, the service life of the disc can be extended. Second, since the two head mechanisms are moved by one head moving mechanism, the apparatus is simple in construction and compact in size. Third, the apparatus of the invention eliminates the troublesome and complicated procedures required in the conventional apparatuses using the double-face heads opposing each other, such as the locating work of both heads and the timing adjustment of face registration of both heads. Accordingly, the assembly efficiency can be remarkably improved and the cost of production can be reduced as much. Thus, the flexible magnetic disc driving apparatus provides an excellent action and effect as compared with that of the prior art apparatuses.

What is claimed is:

1. A double-sided magnetic disc driving apparatus comprising:

means for receiving and clamping a magnetic disc in a housing, said magnetic disc being placed in a jacket having two windows formed on each side thereof angularly spaced apart from each other by an acute angle with respect to the center of said disc;

a means for rotating the disc;

two magnetic heads each mounted on respective head mechanisms which are angularly spaced apart from each other correspondingly to said windows, each said mechanism comprising a lower support arm located below the magnetic disc and an upper support arm above the disc, a magnetic head being mounted on one of said upper and lower support arms and an elastic push member being mounted on the other support arm of one mechanism, and a magnetic head and elastic push member being mounted on the support arms of the other mechanism in reverse configuration to said one mechanism, said mechanisms being located relative to the disc such that each of said heads and push members are placed adjacent the upper and lower surfaces of the disc through said two windows on each side of the jacket of the disc, whereby one head is capable of reading and writing on an upper surface and the other head on a lower surface of the disc, said head mechanisms each including means for guiding the respective heads and push members translationally over the respective surfaces of the disc a single means for simultaneously driving both heads and push members along their respective guiding means to transduce on both sides of the disc.

2. The flexible magnetic disc driving apparatus as defined in claim 1 wherein said single means includes a step motor having a rotary shaft and a cam fixed thereto, and each of said head mechanisms includes an interconnecting means which is moved by the cam.

3. The flexible magnetic disc driving apparatus as defined in claim 2 wherein said cam includes a guide groove parallel to the outer circumference of the cam.

4. The flexible magnetic discs driving apparatus as defined in claim 3 wherein each said interconnecting means comprises a leaf spring and two balls.

* * * * *